United States Patent [19]

Mongeau et al.

[11] Patent Number: 5,053,241

[45] Date of Patent: Oct. 1, 1991

[54] FAT REDUCED SPREADS AND PROCESS OF MAKING

[75] Inventors: Gerald Mongeau, Sherbrooke; Phillipe Bergeron, Bromptonville; James J. Clark, Mississauga; Ronald W. Charlton, Waterloo; Mahmound Eino, Mississauga; Terrence J. Maurice, London; Estelle M. Parnell-Clunies, Cambridge; Wen-Song Cheng, London, all of Canada

[73] Assignees: Ault Foods Limited; Investissements Mongeau Inc., both of Canada

[21] Appl. No.: 436,042

[22] Filed: Nov. 13, 1989

Related U.S. Application Data

[63] Continuation-in-part of Ser. No. 184,186, Apr. 21, 1988.

[51] Int. Cl.$^5$ ............................................. A23D 7/00
[52] U.S. Cl. .................................. 426/603; 426/518; 426/519; 426/581; 426/583
[58] Field of Search ............... 426/581, 583, 518, 519, 426/603

[56] References Cited

U.S. PATENT DOCUMENTS

| | | | |
|---|---|---|---|
| 3,889,005 | 6/1975 | Brammer et al. | |
| 3,939,290 | 2/1976 | Terada et al. | 426/602 |
| 3,982,025 | 9/1976 | Hashimoto et al. | |
| 4,000,332 | 12/1976 | Strinning et al. | |
| 4,273,790 | 6/1981 | Bosco et al. | |
| 4,443,487 | 4/1984 | Darling | |
| 4,540,593 | 9/1985 | Moran et al. | |

FOREIGN PATENT DOCUMENTS

| | | |
|---|---|---|
| 1105316 | 7/1981 | Canada |
| 1168923 | 6/1984 | Canada |
| 1176099 | 10/1984 | Canada |
| 1184422 | 3/1985 | Canada |
| 1186175 | 4/1985 | Canada |

Primary Examiner—Donald E. Czaja
Assistant Examiner—Helen Pratt
Attorney, Agent, or Firm—Fisher, Christen & Sabol

[57] ABSTRACT

A fat-reduced, edible, water-in-oil spread is produced by heating a fat which is normally solid at room temperature so as to melt a substantial proportion of less thermally stable crystals in the fat; homogeneously admixing sufficient water to the heated fat to reduce the proportion of fat in the resulting admixture; cooling the admixture to crystallize a substantial proportion of the uncrystallized fat and produce a pumpable plastic mass; and subjecting the pumpable plastic mass to cutting and mixing in a turbine-like comminuting device while limiting the temperature rise of the plastic mass.

33 Claims, 11 Drawing Sheets

FAT REDUCED SPREADS AND PROCESS OF MAKING

This application is a continuation-in-part of Application Ser. No. 07/184,186, filed Apr. 21, 1988.

FIELD OF THE INVENTION

The present invention relates to improvements in the manufacture of edible low-fat spreads.

BACKGROUND OF THE INVENTION

Conventional butter products contain about 80% fat, 15% water and 1.5% salt, and a mixture of minor amounts of other milk components that are carried over into the butter during the churning process. The problem with conventional butter products is essentially two-fold. First, these products are highly concentrated forms of valuable butterfats, that in some cases are in short supply and in others can find productive applications other than in the form of conventional butter products. Secondly, while highly nutritional, butterfat belongs to a class of foods which are often in excess, at least in North American diets. As a consequence of these factors there has been much interest in developing butterfat or butterfat substitute products which are functionally fungible with conventional butter products.

Much of the technological focus on low-fat butter or butter substitutes has been on attempts to blend ever larger proportions of water into fat/water mixtures. The addition of water to fats in these mixtures inherently raises issues of emulsion instability, with it's associated problems becoming progressively more exacerbated in proportion to the increasing amounts of water that are incorporated into the mixtures.

A case in point concerns attempts at forcing large amounts (i.e. about 60%) of water into a 40% fat envelope, to produce a low-fat form of the generally preferred water in oil type emulsion. (This type of emulsion is preferred over oil in water emulsions because the kinesthetic properties of the latter are markedly dissimilar to butters corresponding organoleptic properties. In addition, edible oil in water emulsions have notoriously poor microbiological stability. Moreover, the physical stability issues at low-fat concentrations in oil in water emulsions are fundamentally different from the physical stability of water in oil emulsions, and the two are not at all comparable in their behavior in this regard). Although there is a substantial body of literature documenting the extensive efforts that have been expended on dealing with these instability problems, relatively little is known beyond the strictly empirical solutions that have been offered to date. According to the Encyclopedia of Chemical Technology: "Emulsion technology is at present based on a trial and error experience and a quasi-logical extension of that experience."

In general when the relative proportions of the continuous phase and the discontinuous phase reach certain critical concentrations, the emulsion tends to destabilize. This is central to the problem faced in low-fat butter products where the continuous fat phase is stretched to the limits of it's ability to contain the relatively high proportions of water that are typical of these products.

Instability can manifest either as phase separation or phase reversal. When the relative concentrations of the phases approach the above-mentioned critical conditions, it is necessary for other characteristics of the emulsion to augment the stability of the emulsion in order to meet commercial product specifications. In the case of low-fat butter, those specifications call for a water in fat phase relationship which resists phase separation (i.e. weeping, wheying-off, or bleeding). In general, the greater the resistance these products have to phase separation the better, and the more closely the product will emulate butter.

The problem of instability has been addressed chemically. Three approaches have been tried: 1) alteration of the fat components through addition of other fats and/or refinement of certain butterfat species; 2) addition of emulsifying agents, from both natural and commercial sources; 3) addition of stabilizing agents such as gums and gelling agents. All these approaches retard, to greater or lesser degrees, the coalescence of the discontinuous phase of the emulsion.

The alteration of the fat components is aimed at increasing the viscosity of the emulsions continuous phase, by increasing the degree of saturation, or the average molecular weight, or both, and hence increasing the average melting point temperature of the continuous phase. This solution has been employed commercially, but suffers from the fact that the changes in question change the plasticity of the fats and modify the kinesthetic properties of the resulting products. Other organoleptic properties may also be adversely affected, especially in the case where other fats such as vegetable fats are added. Additionally, market studies have shown a marked consumer resistance to the addition of non-dairy fats. On the other hand, refinement of dairy fat components is a very expensive alternative and has not been widely adopted.

The second of the above-mentioned approaches to stabilizing the emulsion chemically, involves the use of emulsifying agents. Broadly speaking, these agents include natural sources of emulsifying agents such, as for example, non-fat milk solids and buttermilk. Caution must be exercised in the use of these emulsifying agents since these are the same agents which normally support the oil in fat emulsions of milk and cream and might therefore increase the risk of phase reversal when used in water in fat emulsions. It is significant that buttermilk is separated out during churning of conventional butter products. Other natural emulsifiers include various soy fractions and the like, although theses suffer from the disadvantage of not being indigenous to dairy products, and hence do not enjoy the "natural" connotation. Commercial emulsifying agents include lecithin, various phospholipid preparations, surface active agents ("detergents") and distilled mono and diglycerides Strong commercial emulsifying agents, however, have the potential to actually destabilize the emulsion by reducing the apparent viscosity. Moreover, North American marketing research attributes much of the lack of commercial success of products containing such agents, to consumer attitudes towards the use of "chemical" additives in foods.

The third approach involves the use of stabilizers to increase the viscosity of the water phase. Water-soluble gums and gelatins are useful for this purpose. Again, the addition of these agents is not well received by consumers.

The instability of water in oil emulsions at high concentrations of water has also been addressed through mechanical emulsification treatments. In general, as the proportion of the dispersed phase realtive to the continuous phase increases, the viscosity of the emulsion also increases. In particular, when the volume of the dispersed phase exceeds the volume of the continuous phase, the emulsion particles become crowded and the "apparent" viscosity of the emulsion takes on a "structural" component over and above the viscosity contributed by the continuous phase. In order for this structural viscosity to manifest in emulsions with high concentrations of a dispersed phase, the particle size of the dispersed phase must be small enough to resist spontaneous coalescence and emulsion destabilization. Mechanical emulsification is essential for these purposes.

The churn is one of the many devices that has been employed to this end, even if perhaps for no better reason than it's long association with the butter industry. Bullock, J. Dairy Science, vol.52, no.5, 1969 found that serum and butter mixtures could be placed in plastic bags and tumbled in a churn. After one hour in the churn, these laboratory scale mixtures had formed water in oil emulsions with small, fairly well distributed water droplets. The action of the churn depends for its effect entirely upon so-called "turbulent mixing" in which turbulence and diffusion result in both particle size reduction and dispersion of the discontinuous phase. While perhaps suitable for the processing of low viscosity emulsions, such mixing is very inefficient when dealing with more viscous emulsions (i.e. where viscosity is high enough to negate mixing forces based of turbulence and diffusion alone). Note that a full hour was required to process even the very small test samples described in the Bullock reference.

A wide variety of emulsification equipment has been used with the objective of breaking up or dispersing the discrete liquid phase in the fat phase so that the particles of the dispersed phase in the resulting emulsion are small and uniform enough to prevent coalescence and consequential breakdown of the emulsion. This aspect of the emulsions stability is most significant during post-emulsification handling of the product, and remains so until fat crystallization and thixotropic aging of the emulsion brings the product's stability up to its full potential.

In general, emulsification equipment is divided into two general categories: propeller emulsifiers and turbine emulsifiers. The Hobart mixer described by Bullock et al falls into the former category, and although that particular model is no longer commercially available it is, according to the manufacturer, equivalent to Hobart Model A-200T 20 quart Mixer which operates a variety of agitators and beaters and the like, at speeds of between about 100 and 400 rpm. This mixer produces both dispersive and distributive forces, and relies primarily on turbulent mixing for this purpose. Stephan Machinery Corporation recommends the use of its models UMM/SK and TC/SK type mixers for low-fat spread applications. The UMM/SK and TC/SK type mixers are essentially multiple propeller type mixers having characteristics which to some degree minimize the limitations imposed by simple turbulent mixing through the introduction of larger mechanical shear components into the mixing process. See for example, U.S. Pat. No. 4,056,640.

Since turbulent mixing depends primarily on turbulence and diffusion, its usefulness as a standalone technique for producing fine emulsions is somewhat limited to the processing of low viscosity fluids, even though, in gross, the folding over of higher viscosity mixtures can be adequate for some purposes, (as in the case of baking doughs, for example). Processes for producing fine emulsions of relatively high viscosity fluids, are known which involve the use of homogenizers and colloid mills. Both these devices have been classified as "modified" turbine emulsifiers, (see Encyclopedia of Chemical Technology, Volume 5, Page 705) and both are known to be capable of producing high levels of fluid shear, as reflected by the associated mechanical heat rise during processing.

In a homogenizer, emulsification is effected by forcing the two phases past a spring-seated valve. This is usually done at relatively high pressures of 500 to 3,000 psi. Emulsification occurs not only while the components pass under the valve seat but also when the emulsion impinges against the retaining wall that surrounds the valve. As a general rule, homogenizers usually give an emulsion of finer average particle size than colloid mills, although the particle size is not as uniform. Possibly this is a reflection of greater dispersive forces at play in the homogenizer, but that such processing is much more statistical (i.e. non-uniform). A mechanical temperature rise of about 10° F. to 30° F. (6° C. to 17° C.), is typical of homogenization processes, although depending on the type of supply pump that is used, this may run as high as between 50° F. to 90° F.

In low-fat butter processing, it is generally acknowledged that high pressure treatments have a disadvantageous, destabilizing effect on the emulsion. In addition, lack of uniform processing in homogenizers may leave a proportion of the dispersed phase in the form of particles which are large enough to act as or promote the formation of coalescence nuclei either during subsequent processing or in the final product. It is known, for example, that particles of different sizes coalesce more easily than do particles of the same size. Once such coalescence begins, it has the potential to destabilize significant amounts of the emulsion and result in weeping, etc.

Colloid mills on the other hand, produce the desired high degree of uniformity of particle size without necessarily engendering the kinds of operating pressures associated with homogenizers. South African patent application number 86/2344, for example, cites line pressures of between 80 and 116 psi, with pressure drops across the mechanical emulsifier in the range of 22 to 58 psi. This mechanical emulsifier is specially designed for the purpose of minimizing operating pressures. For these reasons, much interest has been shown in their application in the production of low-fat butter products.

Unfortunately, colloid mills in general are known to result in very high mechanical temperature rises, on the order of between 30° F. to 140° F. (17° C. to 79° C.). The resulting high processing temperatures are known to decrease the viscosity of the continuous phase of the emulsion and have an adverse effect on its stability. In addition, although the dispersive forces generated in these devices produce highly uniform particle sizes, they do not appear to produce corresponding levels of distributive forces. Without such distributive forces, inter-particle distances within the emulsion are not maximized and the more closely packed particles of the discontinuous phase will have an increased probability of initiating coalescence, manifesting in gross destabilization of the emulsion.

A series of South African patent applications assigned to Unilever, (including the above-mentioned South African patent application number 86/2344), deal with a process in which a thermoplastics extruder is utilized for the purpose of producing low-fat butters and the like. The device can be thought of as a modified colloid mill and is described in detail in U.S. Pat. No. 4,419,014.

The device is intended to produce a smooth streamlined flow with limited substrate exposure to simple shear across shear lands (for dispersive mixing) and laminar shear within the hemispherical cavities (to facilitate more uniform distributive mixing) over and above such turbulent mixing ("folding") as results when the substrate flow is repeatedly subdivided (across the shear lands) and recombined during its transit through the device. According to the literature, this arrangement is thought to reduce operating back-pressures, as already noted herein, as well as reduce mechanical temperature rise and improve uniformity of processing by reducing product back flow within the device.

Notwithstanding this purported reduction in simple shear and increased laminar shear (and better distributive mixing) and even the supposed reduction in processing delta-t and more uniform substrate treatment, the process in question still requires temperature processing control. The use of an integrated heat exchanger apparently results in a more uniformly dispersed emulsion, presumably because the fat phase is sufficiently viscous at the reduced processing temperatures to retard post emulsification coalescence of the dispersed phase. One of the Unilever patents discloses that such temperature control is essential to producing the homogeneity which is taught to be essential to that process. Temperature control therein is affected by maintaining stator surface temperatures of $-20°$ C., in order to keep the average delta-t of the substrate within the range of $2°$ C. to $10°$ C.

There are a number of problems associated with this approach. First of all, optimal fat crystallization is an extremely complex interrelationship between endo and exothermic reactions within the processing milieu. External temperature control alters the thermodynamics of such processes on the microstructural level even while attempting to compensate for the mechanical thermodynamic inputs in gross. This is a necessary consequence of heat transfer inertia into and within the substrate during processing even between the narrow annulus formed between the rotor and stator. This problem cannot be helped any by the fact that in some embodiments the stator bears the temperature controlled processing surface, even though the mechanical energy density is highest along the rotor/substrate interface adjacent which the highest substrate acceleration occurs. In any case, the microcrystalline structure of the fat phase does not appear to be stabilized as effectively as might be desired, through the use of such overt external cooling. Consequently, even though South African patent application number 86/2344 indicates that margarine products produced using this process can be packed as "cakes", there is no disclosure of any ability to print products based solely on butterfat emulsions containing large amounts of water, which is presumably a reflection of the latter emulsions (as produced in accordance with the application) inability to survive the rigors of the printing process.

SUMMARY OF THE INVENTION

In accordance with one aspect of the practices set out herein, there is provided a process for producing edible water-in-oil emulsions comprising the steps of:

a) subjecting a mixture of water-in-oil to a high degree of simple shear to disperse the discontinuous water phase by reducing the average particle size and particle size variance;

b) briefly subjecting the sheared mixture to mild post shearing turbulent mixing to distribute the discontinuous water phase sufficiently to increase the average interparticle distance and decrease the variance thereof;

wherein the increase in the temperature due to shearing and mixing of the resultant water-in-oil emulsion is from about 1.5 Celsius degrees up to a temperature where the mixture becomes destabilized and substantial amounts of water are released from the water-in-oil mixture.

In accordance with a broad aspect of the present invention there is provided a process for producing fat reduced edible water-in-fat spreads wherein the reduction in the amount of fat otherwise present is carried out primarily through the addition of water as a finely dispersed phase to an at least partially uncrystallized fat, the improvement in which comprises subjecting the resulting mixture to cutting and mixing in a turbine like comminuting device, wherein the increase in the temperature in the mixture due to cutting and mixing thereof is from about 1.5 Celsius degrees up to a temperature where the mixture becomes destabilized and substantial amounts of water are released from the water-in-oil mixture.

In accordance with a further aspect of the present invention there is provided a process for producing a fat reduced edible water-in-oil spread of the type produced by dispersing water into an at least partially uncrystallized fat comprising the steps of:

a) substantially crystallizing the fat; and, b) subjecting the resulting mixture to cutting and mixing in a turbine like comminuting device;

wherein the increase in the temperature of the mixture due to cutting and mixing thereof is from about 1.5 Celsius degrees up to a temperature where the mixture becomes destabilized and substantial amounts of water are released from the water-in-oil mixture.

Preferably the increase in the temperature of the mixture due to cutting and mixing thereof is between 1.5 and 20 Celsius degrees; temperature increases of greater than 10 Celsius degrees can be tolerated if the product is to be packed in a tub, and preferably between 1.5 and 10 Celsius degrees if the product is to be printed in known manner. It is especially preferred that the increase in the temperature of the mixture due to cutting and mixing thereof be between about 1.5 and 8 Celsius degrees. It is preferred that no active cooling be applied.

The edible fat is preferably selected from one of a group consisting of butterfat, margarine fats and mixtures thereof. Butterfat is preferably selected from a source such as butter, renovated butter, or butter oil, or mixtures thereof, and butter itself preferably comprises about 80% milk fat, 16% moisture and about 2% milk solids not fat, and up to about 2% salt.

Preferably sufficient water is dispersed into the at least partially uncrystallized fat so that the resulting mixture contains between 75% and 35% fat, and preferably between 30% and 50% fat as a proportion of the total weight of the mixture. Most preferred are low-fat mixtures containing between 35% and 40% fat as a proportion of the total weight of the mixture. It is highly desirable that the water be homogeneously dispersed in the substantially crystallized edible fat prior to subjecting the mixture to cutting and mixing.

Preferably the mixture of water dispersed in the substantially crystallized edible fat has a temperature of from 13° C. to 17° C. (preferably 14.5° C. to 16.5° C. and especially preferably 14.5° C. to 15.5° C.), and penetrometer values between 210 and 360.

It is preferred that following cutting and mixing the mixture has a temperature of between 15° C. and 18.5° C. (especially 15.5° C. and 16.5° C.), and a penetrometer value of between 210 and 290, with values between 230 and 270 being especially preferred.

Preferably the temperature rise in the mixture due to mixing alone is about 0.5 to 1 Celsius degrees.

The turbine like comminuting device preferably comprises an inlet for receiving the mixture, the inlet being connected to a comminuting chamber housing at least one pair of mutually adjacent cutters each bearing a plurality of blades with a plurality of passages formed there between, the cutters being arranged to be driven independently of any flow of the mixture through the chamber, for relative mutual rotation with respect to one another as nozzle and bucket, respectively, in a turbine arrangement, and through which the mixture can be passed. Upon passage of the mixture through the blades the mixture is subdivided at the passages formed between the blades of the nozzle cutter into a plurality of flows. On relative rotation of the cutters, the flows of the mixture are cut between the respective blades of the cutters, and then passed on through the plurality of passages formed between the blades of the bucket cutter and subjected to mixing through the recombination of the plurality of flows, within a portion of the chamber adjacent an outlet therefrom, through which the mixture can exit the comminuting apparatus.

Preferably the comminuting device is a single stage turbine, and especially a radial turbine, having concentric annular cutting rings.

The present invention also includes a process for producing fat reduced edible water-in-fat spreads comprising the steps of:

a) heating a fat which is normally solid at room temperature, to below the heat of fusion of the most thermally stable crystals in the fat, for a period of time and to a temperature sufficient to melt a substantial proportion of less thermally stable crystals in the fat;

b) homogeneously admixing sufficient water to the heated fat to reduce the proportion of fat in the resulting mixture between 30% and 75% as a proportion of the total weight of the mixture;

c) cooling the admixture to crystallize a substantial proportion of the uncrystallized fat to increase the solids level and increase the viscosity of the admixture to produce a pumpable plastic mass;

d) subjecting the pumpable plastic mass to cutting and mixing in a turbine like comminuting device wherein the increase in the temperature of the plastic mass due to the cutting and mixing thereof is from about 1.5 Celsius degrees up to a temperature where the mixture becomes destabilized and substantial amounts of water are released from the water-in-oil mixture.

For the present purposes, fat-reduced spreads shall mean spreads having 75% or less fat (as a proportion of the total weight of the mixture). As used herein the term fat-reduced extends only to those products in which a substantial proportion of the fat the would otherwise be present in the product has been replaced through the addition of water. In accordance with one embodiment of the present invention, for example, such products contain between about 50 to 65% total solids. Low-fat spreads herein shall mean fat-reduced spreads containing (on the same basis as aforesaid) between about 50 and 30% fat, and in particular those having between 35 and 40% fat.

The present invention also relates to a process for producing fat reduced edible water-in-fat spreads wherein the reduction in the amount of fat otherwise present is carried out primarily through the addition of water as a finely dispersed phase, and wherein the improvement comprises heating the additional water and a fat which is normally solid at room temperature to below the heat of fusion of the most thermally stable crystals in the fat, for a period of time and at a temperature sufficient to melt a substantial proportion of less thermally stable crystals in the fat and such that the remaining more thermally stable crystals provide growth sites favouring the growth of more thermally stable species of fat crystals during subsequent fat crystallization, prior to mechanically subdividing the water therein to produce the fine dispersion.

In accordance with another aspect of the processes of the present invention there is provided a process for producing a fat reduced edible water-in-fat spread wherein the reduction in the amount of fat otherwise present is carried out primarily through the addition of water as a finely dispersed phase to an at least partially uncrystallized fat, and in which the improvement comprises actively and uniformly cooling the mixture from about 90° F. to 98° F. down to about 10° C. to 19° C. in about 1 to 2 minutes, which conditions favour the growth of large, thermally stable fat crystals from sufficient of the partially uncrystallized fat, to produce a pumpable plastic mass prior to mechanically subdividing the water therein to produce a fine dispersion.

In addition to products produced in accordance with the practice of the preceding processes, products per se are also included as aspects of the present invention. These include an uncomminuted intermediate useful in the production of fat reduced spreads, the intermediate comprising a crystallized, edible, pumpable plastic water-in-oil mixture having a penetrometer value in the range of 210 to 360 and a concurrent temperature of between 13° C. and 17° C. (preferably 14.5° C. and 16.5° C. and especially 14.5° C. and 15.5° C.) as measured immediately prior to comminution thereof.

Also provided are comminuted intermediates useful in the production of fat reduced spreads, which comminuted intermediate comprises an edible water-in-oil mixture having a penetrometer value in the range of 210 to 290 and a concurrent temperature between 15.5° C. and 16.5° C. as measured immediately following comminution thereof and prior to any substantial post comminution crystallization. Preferably the penetrometer value of the comminuted intermediate is between 230 and 270.

The uncomminuted and comminuted intermediates preferably have a fat content of 75% or less, preferably between 30% and 75%. Especially preferred are low-fat intermediates having fat contents in the range of 50% to 30% and particularly 35% to 40%.

The intermediates preferably have a total solids contents of between 65% and 45% as measured with the mixture equilibrated to room temperature. Non-fat solids contained in the mixture are preferably non-fat milk solids. The admixtures hereinabove preferably consist of buttermilk and butter or buttermilk butter, and added water. Where buttermilk is present in the mixtures it is preferably derived from buttermilk, or condensed or reconstituted buttermilk. These mixtures can further include minor, effective amounts of flavouring, colouring and if desired, preservatives. When butter is included in the admixture it preferably comprises 80% butterfat, between 1% and 2% non-fat milk solids, and between 0% and 2% solids. Especially preferred are butters comprising about 80% butterfat between 1.3% and 1.5% non-fat milk solids and about 2% salt.

Buttermilk present in the admixture preferably comprises about 24% to 33% total solids and 1.5% to 2% butterfat. A preferred admixture comprises about 30% to 44% buttermilk, 0% to 22% added water, 45% to 68% butter and 0% to 1% added salt. These intermediates are especially preferred when they are low-fat spreads and the amount of added water is between 8% and 22%. low-fat spreads containing between 45% to 47% butter are especially preferred. Total solids contents of 45% to 50% are especially preferred in low-fat spreads.

Furthermore, the products according to the present invention extend to fat reduced edible spreads comprising a substantially crystallized printable, pumpable plastic water-in-oil mixture consisting of butter and buttermilk and having a fat content of 75% or less, and a total solids content of 45% to 65% at room temperature. Where necessary such products can further include added water. Fat content of the edible spread is preferably in the range of 75% to 30%, more preferably in the range of 50% to 30%, and especially preferably in the range of 40% o 35%. A total solids content of between 45% and 50% is preferred. In addition, it is preferred that the buttermilk be condensed buttermilk. The mixture can also include minor effective amounts of flavouring, colouring and if desired preservatives.

BRIEF DESCRIPTION OF THE DRAWINGS

FIG. 1 is a partial, longitudinal section through the comminutor apparatus.

FIG. 2 is a plan view in cross section through the comminutor chamber and cutting rings of the apparatus in FIG. 1.

FIG. 3 is an exploded perspective view of the comminutor housing and blade assembly of the apparatus depicted in FIG. 1.

FIG. 4 is a detailed, exploded view of the blade assembly depicted in FIG. 3.

DETAILED DESCRIPTION

Fats

Figure 1:
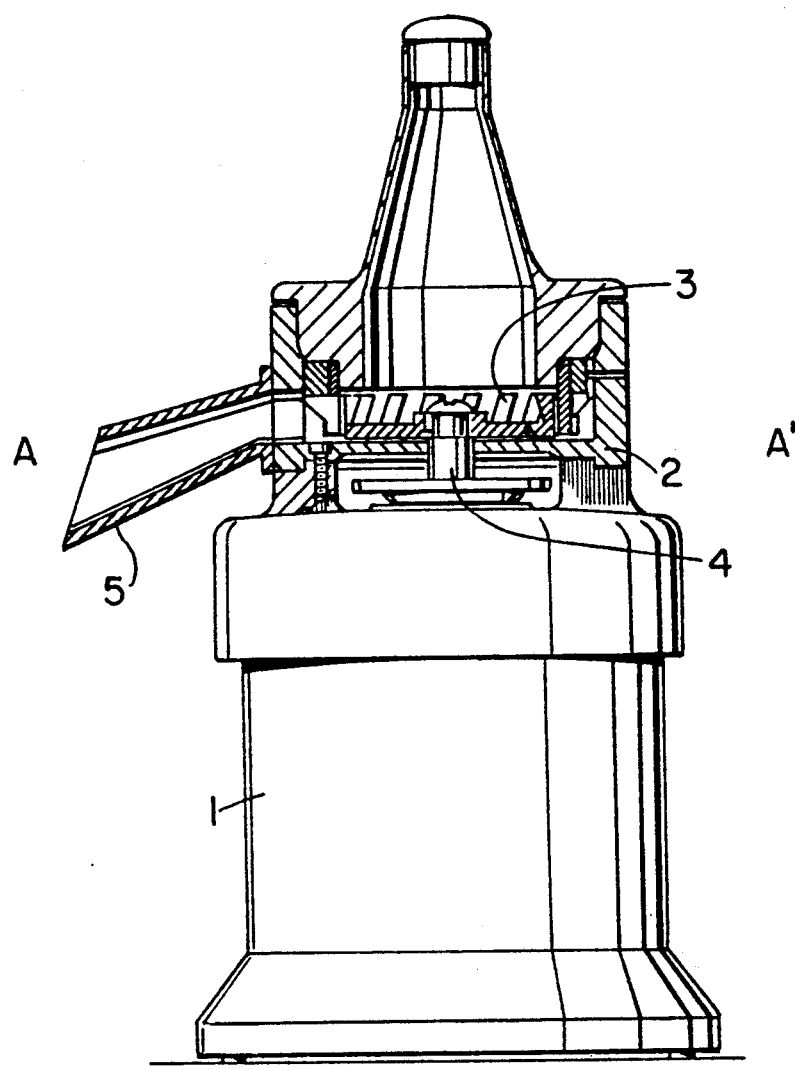
FIGS. 1 through 4 of the drawings appended hereto illustrate various views and perspectives of a turbine comminutor especially suited to the practice of the present invention.

As used herein the terms oil and fat are to be construed synonymously, unless otherwise clearly indicated by the context. Products of the present invention are fat reduced and low-fat butters and margarine, and accordingly fats useful in the preparation of such products are especially preferred. Although butterfat is not the most inherently stabilizing fat for use in producing low-fat or fat reduced mixtures, it is nevertheless the most desired fat from the consumers' standpoint. Suitable starting materials therefore include butter oil as well as butter itself. Butter is sometimes defined as meaning the food product made exclusively from milk or cream, or both, with or without additional coloring matter, and containing not less than 80 percent by weight of milk fat. A typical analysis of such products might show about 80 percent milk fat, 16 percent moisture, less than about 1 percent curd and up to about 3 percent salt. For the purposes of the present invention, it is noted that butter obtained directly from the churning process is preferred from the standpoint of its inherent stability, over and above so-called process or renovated butter, which lacks the original structure of the butterfat produced by the churning process. For the same reason, "butter oil" is also generally less preferred than butter obtained directly from the churn. Other fats useful in the practice of the present invention are described in the Encyclopedia of Chemical Technology, Volume 8, The Interscience Encyclopedia, Inc., New York, pages 800 through 808.

The fat may be preconditioned by tailoring its crystalline structure to reduce the number of or even altogether remove unstable crystalline forms from the crystalline population at large, even though this necessarily means that without anything more, the overall proportion of solid fats is reduced. preconditioning may be achieved, for example, by heating butter to between about 32° C. to 37° C. for a time sufficient to substantially reduce the amount of solid fats originally present in the form of crystals having melting points at or below such temperatures and to substantially eliminate those having lower melting points. Differential scanning calorimetry studies reveal that the crystalline population of butter typically contains a substantial number of crystals in a form having a melting point in the range 14° C. to 18° C., which for the purposes of the present invention are considered undesirable in the early stages of the fat-reduced or low-fat spreads process. This specific treatment is especially well suited for preconditioning of butterfat, but has application in the case of other fats as well, in that the crystalline population of other fats so treated will then more closely emulate the kinesthetic properties that are associated with butterfat at least in so far as having the organoleptic "melt" characteristics associated with butter is concerned. The treatment, in general, preferentially leaves intact only those crystalline forms which are associated with the desired stability and structure, both of which are properties that play a significant role in subsequent processing of fat-reduced and particularly low-fat spreads.

Water

As already stated hereinabove, the present invention relates to mixtures of water in oil. While the two substances are generally immiscible, solid fats will hold water suspended even though the mixture is not, strictly speaking, in the form of a mixture, provided however that there is a sufficient excess of solid fats to do so. Thus, in conventional butter, fat is present in a sufficient excess and the mixture is stable for all commercial purposes. At the other extreme, however, the larger relative proportions of water in low-fat water-in-oil mixtures destabilize the mixture unless the two are properly dispersed. The moisture content of mixtures of the present invention need not be provided as water per se, but can take the form of, for example, milk or buttermilk. Thus water can be added by way of the addition of condensed, evaporated buttermilk. In this form, the added moisture includes such things as indigenous milk proteins, sugars, some additional butterfat, flavors and so on, each of which make their own contribution to the final product and in some cases affect processing too.

Other Ingredients

Water-in-oil mixtures of the present invention contain sufficient milk solids not fat, and or other indigenous dairy components having the ability to stabilize any particular mixture under the selected processing conditions to which it is subjected. The particular amount required in any case will be readily apparent to the person skilled in the art, in light of the present disclosure and without undue experimentation. Although none may be required to be added, and some may be inherently present (as when butter is used as a source of butterfat for example), the inclusion of such components is generally recommended for commercial production purposes.

Various sources of milk solids not fat may be used when required for this purpose. A particularly preferred source of these components is buttermilk, including buttermilk solids, condensed buttermilk, reconstituted buttermilk and the like.

Buttermilk that has been pasteurized is preferred, since this at least partially denatures indigenous whey proteins, exposing more hydrophobic sites on the protein molecules and reducing the tendency of such proteins to favour phase reversal of water-in-oil mixtures. This permits greater advantage to be taken from any given amount of buttermilk, due to the desirable phospholipids present therein.

In accordance with known practice in the art, various colors, preservatives and flavors (including salt which in the case of conventional salted butter products actually serves both of the latter functions) etc. may be added. Note that any such additives should first be evaluated for effects on mixture stability. Moreover, the fact that there is a lot more water, particularly in low-fat products, is a factor bearing on the amount and efficacy of such additives. In the case of salt, for example, the actual concentration in the water is much lower in a low-fat product than an identical proportion (on a total weight of product basis) of salt would be in a conventional butter product wherein the quantity of salt is dispersed in far less water. This effects both its flavour contribution and preservative value.

Also, and especially where butter is concerned, there may be a market demand for purity and natural products. It is a feature of one aspect of the invention that non-dairy emulsifiers and stabilizers are avoided. However such substances may be used if desired.

Preliminary Mixing/Emulsification of a Water-in-Oil Mixture

The formation of an initial water-in-oil mixture includes the steps of mixing the fat and water under conditions favoring the formation of a water-in-oil phase relationship, which conditions can be readily determined with a minimum of experimentation by a person skilled in the relevant arts in light of the present disclosure. By way of example, there is provided a process for emulsifying a mixture of water and oil, in the presence of emulsifying agents, wherein the water is heated to a temperature about equal to that of a melted fat. In addition to facilitating the desired emulsification of the mixture, the preheating of the water ensures that the thermodynamic processes entailed in the abovementioned tailoring of the fats crystal population are not unduly disrupted. The water is heated to between 32° C. and 37° C. (preferably 33° C. to 35° C.), consistent with the earlier described preconditioning of, especially, butterfat. Note that if the temperature of the mixture exceeds about 37° C., then not only are the benefits associated with thermal tailoring of the fat crystal population lost but phase inversion also can occur, and the thermal contribution of the water to the mixture should be adjusted to take this into account. The two are then admixed under continuous agitation, by introducing water into the oil in a manner which at no time causes any local concentration of water sufficient to initiate phase inversion of the incipient emulsion. Slow rates of addition and sparging the water into the oil both assist in minimizing any localization of water at the outset of the emulsification process. The dispersed phase can be divided and subdivided to a point approaching the limits of the indigenous and/or added, if any, emulsifying agents' ability to support the mixture (i.e. the emulsifying agents' capacity to effect the increased interfacial surface area in the manner required to continue to stabilize that interface).

Precomminution Crystallization

According to U.S. Pat. No. 2,098,010, in connection with the manufacture of conventional oleomargarine products "coarse emulsions, when passed through proper equipment for supercooling the fat, in the manner which has just been discussed, and then agitated while in a supercooled condition, become further dispersed and a very fine emulsion is formed. We have found that milk or water emulsifies very readily and with extreme ease when agitated with fats which are in a supercooled condition. The agitation of the fat in a supercooled condition causes a very fine dispersion of minute droplets of the dispersed phase of the emulsion.

The supercooled product crystallizes or sets up so rapidly that no opportunity is afforded for the coalescence of the finely divided moisture and, consequently, no large droplets are formed. This results in a very fine stable emulsion." On the other hand South African patent applications 86/2341; 86/2343; 86/2344; and, 86/2342 disclose the use of pre-crystallized fat prior to emulsification of a low-fat water-in-oil emulsion. In connection with the present invention it has been discovered that merely increasing solids through supercooling or p re-crystallization is not the answer, even though it may seem to follow that every increase in the viscosity of the continuous phase would necessarily increase the apparent viscosity of the mixture and thereby improve stability of the final product. It has now been found that, surprisingly, there is a criticality associated with the supercooling/ pre-crystallization of fats in the production of spreads which manifests in the type of structure in the final product connected with improving product stability and especially for printing fat-reduced and especially low-fat spreads, and in particular those based on butterfat and containing only minimal amounts of indigenous dairy emulsifiers. The pre-crystallization process can be carried out by reducing the temperature of the previously described coarse mixture from between 32° C. to 37° C. down to about 10° C. to 19° C. in about one to two minutes cooling time. The pre-crystallization can be accomplished on commercially available cystallizers, typically operating at rates of between 1,800 to 4,000 pounds of product per hour. In the Thermutator device described elsewhere herein the preferred throughput is about 2,890 pounds per hour for a one minute residense time and 1,462 pounds per hour for a two minute residence time.

Preferably treatment of the water-in-oil mixture by active cooling in a crystallizer is followed by passing the cooled mixture through a relatively larger diameter feed line to the comminutor device. Thus, while conventional 2" diameter pipes are used throughout the balance of the process, a 3' diameter pipe is used to connect the precrystallization apparatus and the comminutor. The resulting pressure and friction reduction in this larger diameter line is considered advantageous. In addition this tube functions as a passive crystallization device, much like a resting tube for example, and the total proportion of solid fat increases as the mixture passes there through. Note that there may be an attendant temperature rise in association with the release of heat from the mixture, since the crystallization process is exothermic.

Figure 8:
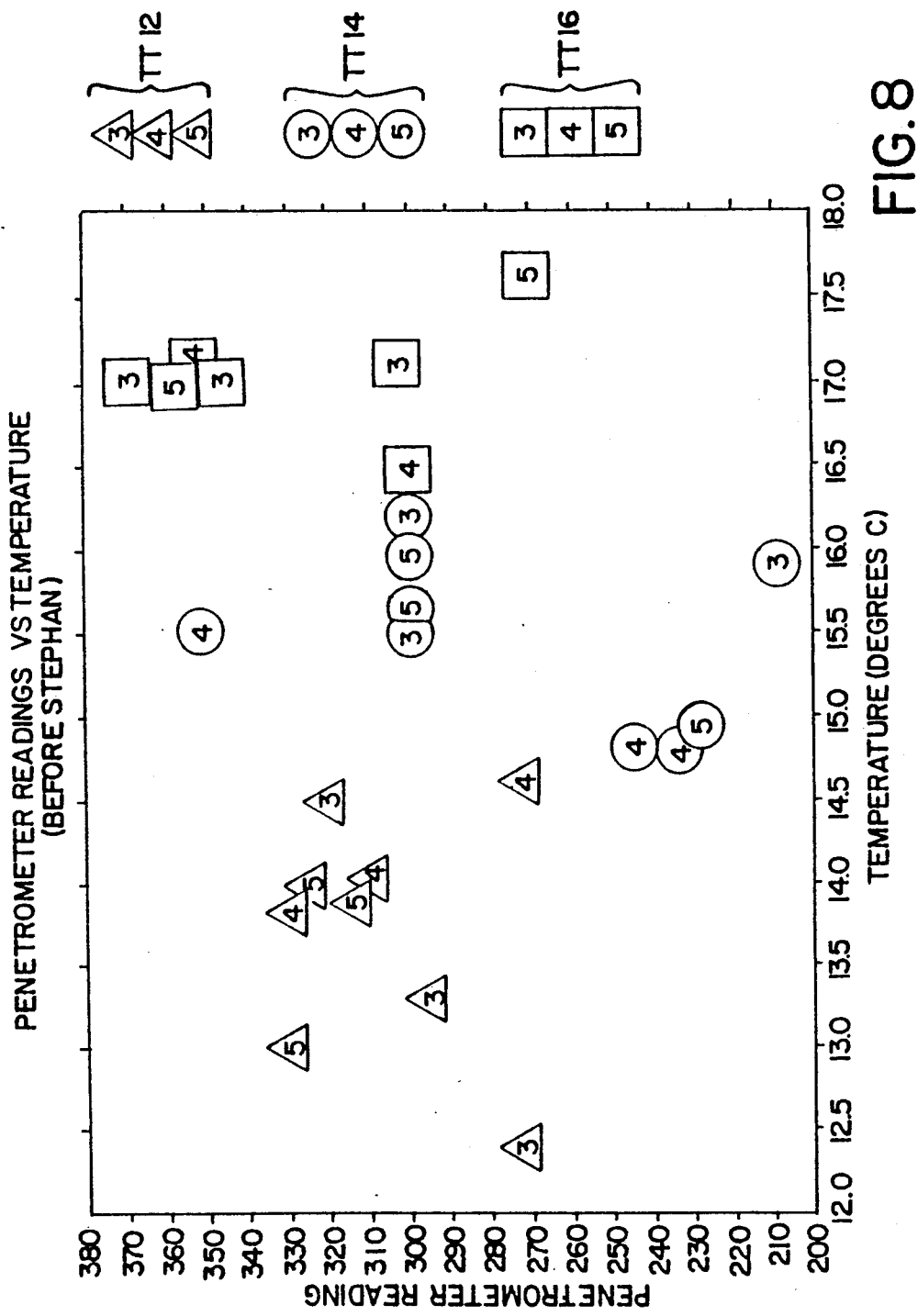
FIG. 8 is a graphical representation in which penetrometer data is plotted against sample temperature for samples of product that have been preconditioned, mixed and pre-crystallized in the fashion described elsewhere herein, and illustrates certain preferred processing conditions associated with "printability" of products of the present invention.

FIG. 8 of the drawings is a graphical representation of penetrometer data plotted against product sample temperatures for low-fat products produced in accordance with a variety of the different processing conditions described herein. This figure illustrates the criticality associated with products which have proved to be most printable. Data points shown on the graph and which are subtended by the number "3" in brackets were characterized as being excellent products from the point of view of having both mixture stability and printable structure. Those data point subtended by the symbol "(1)" were not "printable" (on the Sig Model FD100 printer set to produce and wrap 1 lb prints of product).

Figure 4:
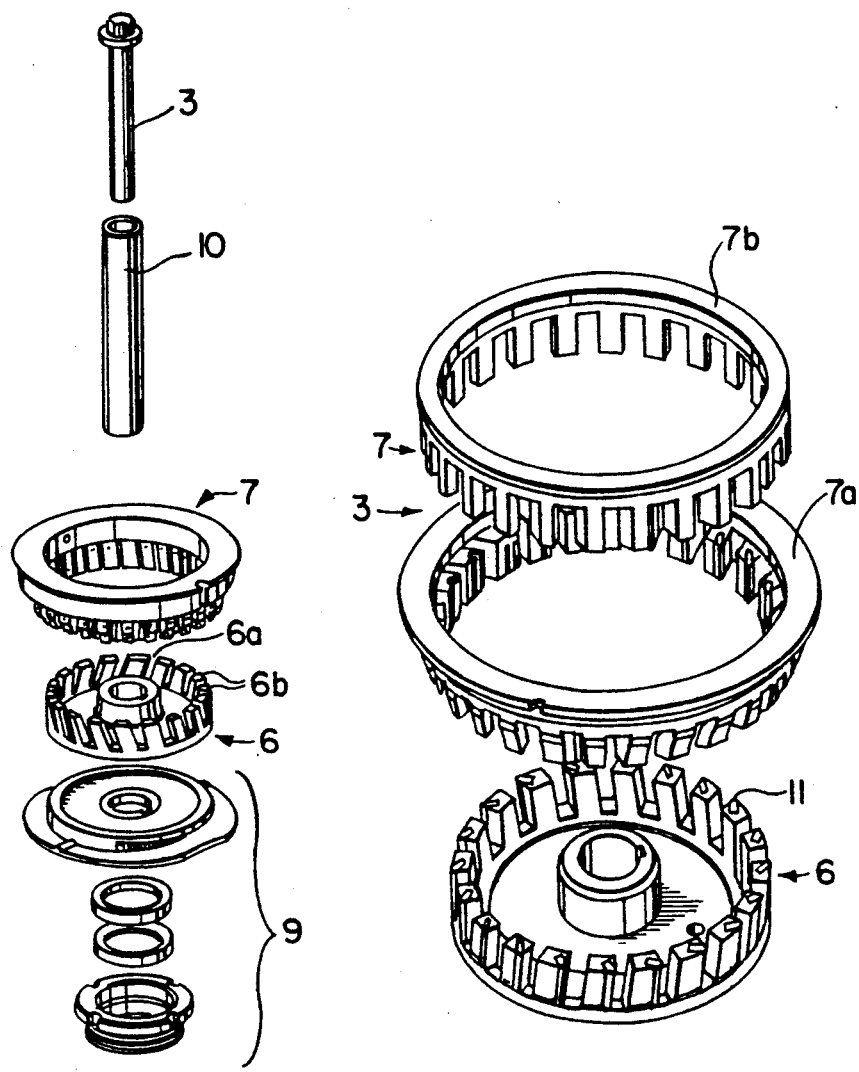
Figure 5:
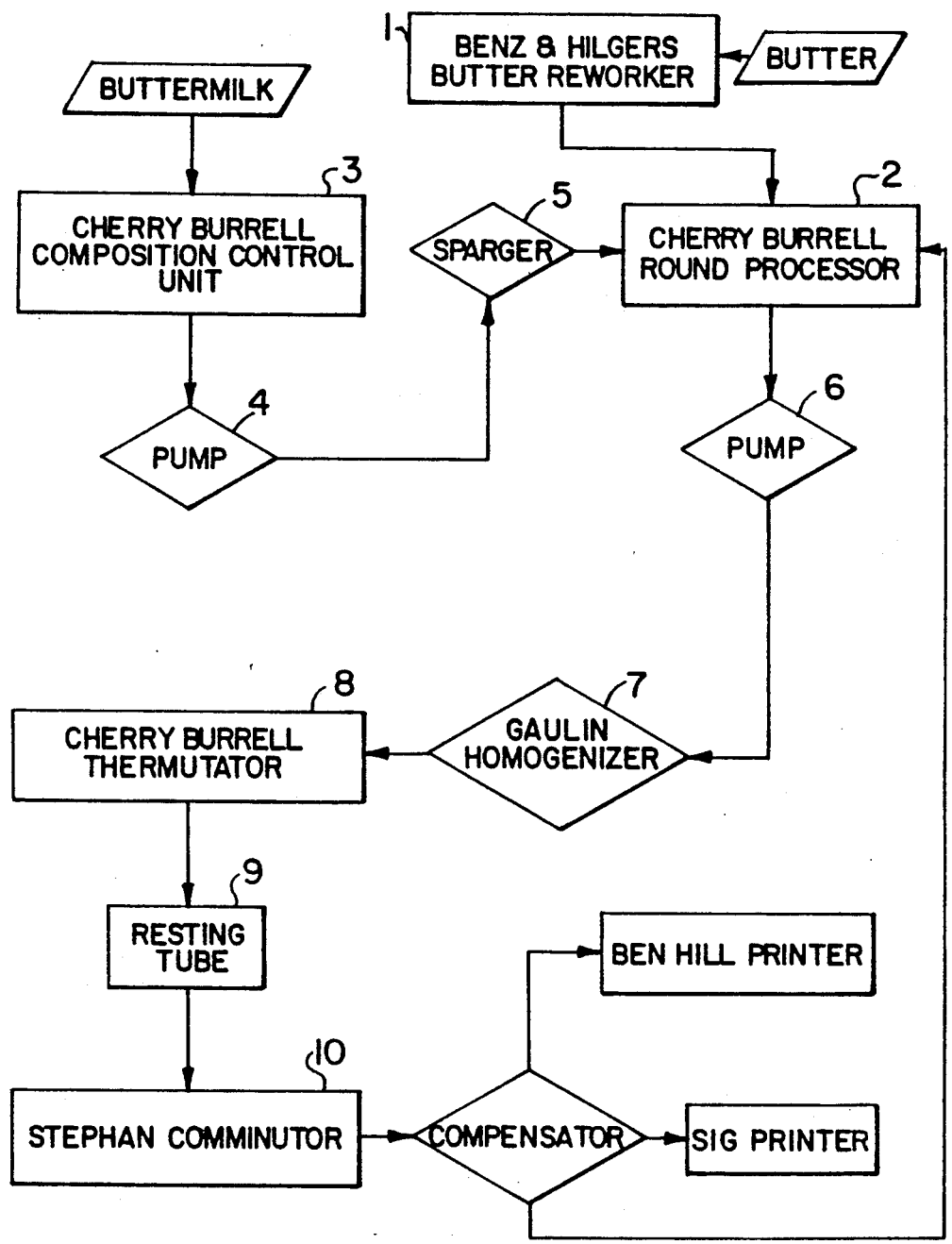
FIG. 5 is a flow chart representing the processing stages and equipment associated therewith, as utilized in an especially preferred embodiment of the present invention.

The products were produced using the process set out in FIG. 5, and the comminuting apparatus depicted in FIGS. 1 to 4. The samples were in every case drawn from the processing line connecting the pre-crystallizing apparatus and the comminutor, and the temperature and penetrometer measurements were taken immediately. The penetrometer readings are measures of the average distances in millimeters that are traversed in each second by a free-falling 50 gram cone penetrometer from a starting point immediately above the flat surface of the sample, and measured over ten elapsed seconds. Preferably, the pre-crystallized water-in-oil mixtures give penetrometer readings of between 210 and 360, and have temperatures of greater than 14° C. and less than 17° C. (preferably 14.5° C. to 16.5° C. and especially 14.5° C. to 15.5° C.).

Figure 6:
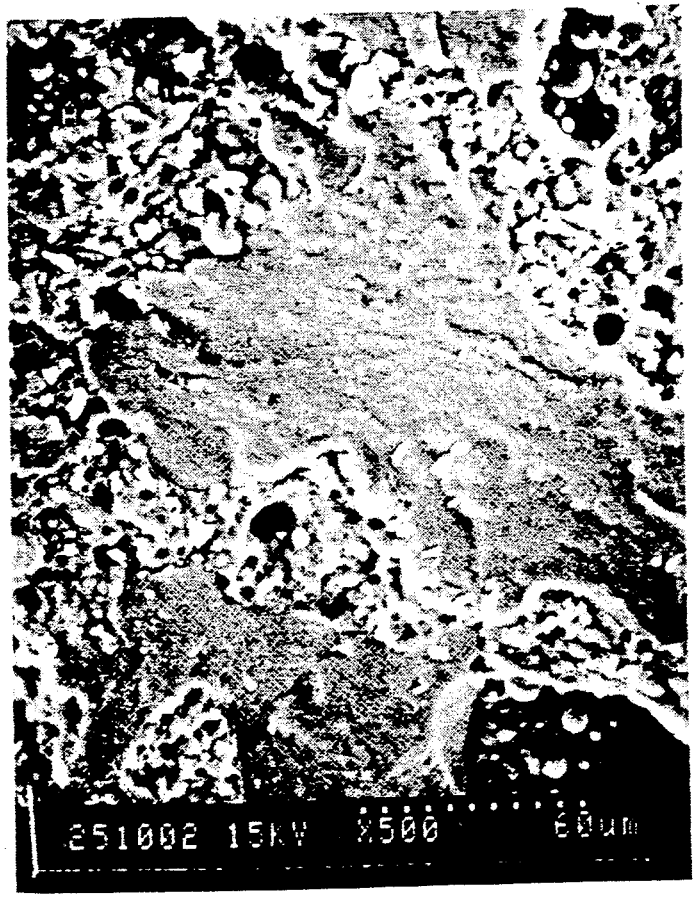
FIGS. 6 and 7 are photomicrographs of mixtures formed pursuant to preconditioning mixing and pre-crystallization in the manner described elsewhere herein.
Figure 7:
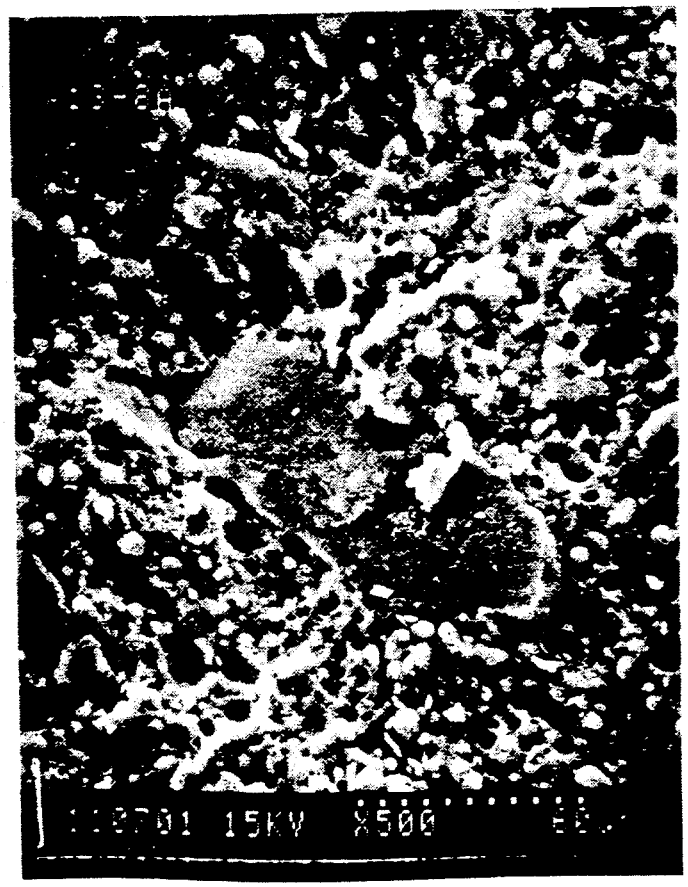

Referring to FIGS. 6 and 7 there is shown cryo-scanning electron micrographs of two samples of the pre-crystallized mixture. These samples were prepared by immersing portions thereof less than 3 cubic millimeters in volume, in liquid nitrogen slush at about −210° C., and fracturing the frozen samples to expose the surfaces to be viewed. These steps were carried out in an EM Scope SP 2000 A cryoprepartion unit. The samples were then warmed to −80° C. for about ten minutes in order to sublime the surface water, then coated with gold and examined at −165° C. under an Hitachi S570 Scanning Electron Microscope equipped with a cold stage. Note that even though the mixture as initially formed gave visual evidence of good homogeneity of dispersion of the aqueous phase, FIGS. 6 and 7 illustrate large amorphous concentrations of water within the fat phases which can manifest as instability in the final product.

Comminution

The process of the present invention is especially advantageous when the mixture has a high viscosity, (as for example in the case of a pumpable plastic mass), and when the edible spread is a low-fat product. In the case of a high viscosity mixture, the relatively small increases in temperature result in correspondingly small reductions in viscosity. As a consequence the viscosity of the continuous phase maintains a substantial stabilizing influence on the mixture. Moreover, when the temperature increase of a high viscosity mixture due to such processing is limited to within 1.5 Celsius degrees to 10 Celsius degrees, there is reason to believe that beneficial effects accrue in the crystalline makeup of the fat phase. The dispersive and distributive mixing forces structure the mixture of water-in-oil in such a way as to increase the stability of the final mixture, as well as favourably influencing the texture and structure of the resulting product.

The single stage shearing action is primarily a form of dispersive mixing, to comminute (subdivide) the water phase into small uniform particle sizes, without imparting too much energy to the system, which would diminish the stabilizing effects of the structure of the continuous phase and undo the effect and benefits of such dispersive mixing by allowing the dispersed aqueous phase to coalesce.

Mild post-shearing turbulent mixing is intended to distribute the dispersed particles within the continuous fat phase ideally so that the inter particle distance is a maximum, and the opportunity for coalescence is thereby reduced.

Determining the balance between dispersive and distributive mixing is a matter within the routine skill in the art in light of the present disclosure. The temperature rise during processing that is attributable to mechanical shear and mixing is between 1.56 and 10 Celsius degrees. Preferably the temperature rise due to distributive mixing is about 0.5° C. Temperature compensation (active cooling) may be used if desired to modify fat crystallization during processing in some particular way.

Apparatus useful for the purposes of comminution pursuant to the present invention include the Ytron Z in line single and multiple stage turbine comminutor manufactured by Dr. Karg GMBH, Daimierstrasse 2, D-7151 Affalterbach. Also useful in the practice of the present invention is the Urschel Comitrol processor model 1700 equipped with a "microcut head" (Urschel Laboratories Inc., 2503 Calumet Avenue, P.O. Box 2200, Valparaiso, Ind., U.S.A.). An especially preferred apparatus useful in the practice of the present invention is the Stephan "Microcut" Model Comminutors. Model MC15 is described in detail in relation to the preferred embodiment as set out hereinbelow.

Figure 9:
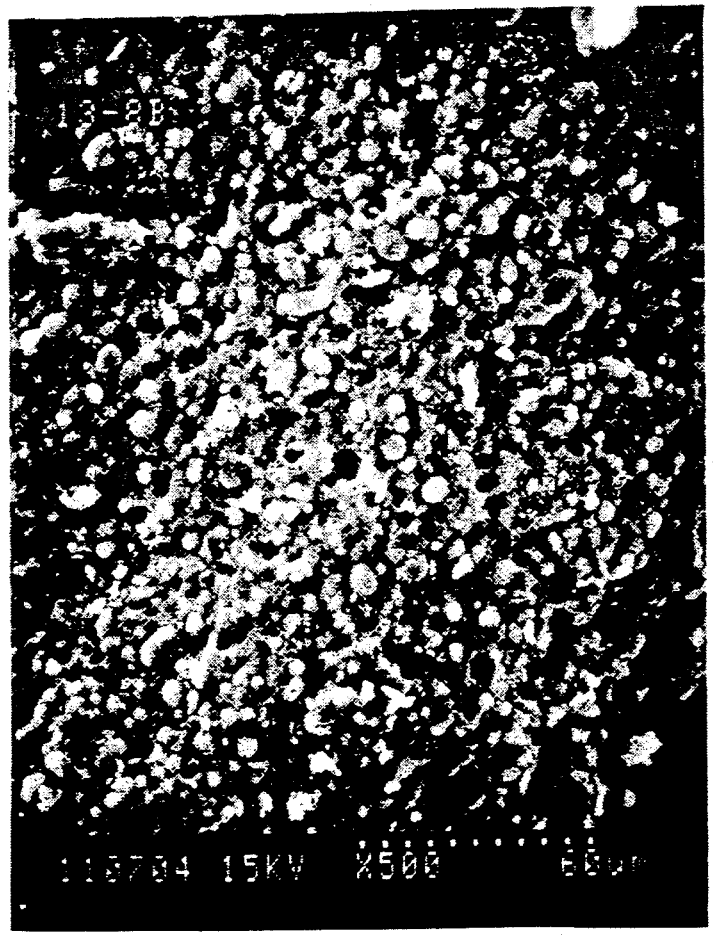
FIG. 9 is a photomicrograph of a product of the present invention following comminution thereof, but before the product is subjected to any substantial post comminution, handling or packaging. This is a sample of the same material that is depicted, at an earlier processing stage, in FIG. 7.
Figure 10:
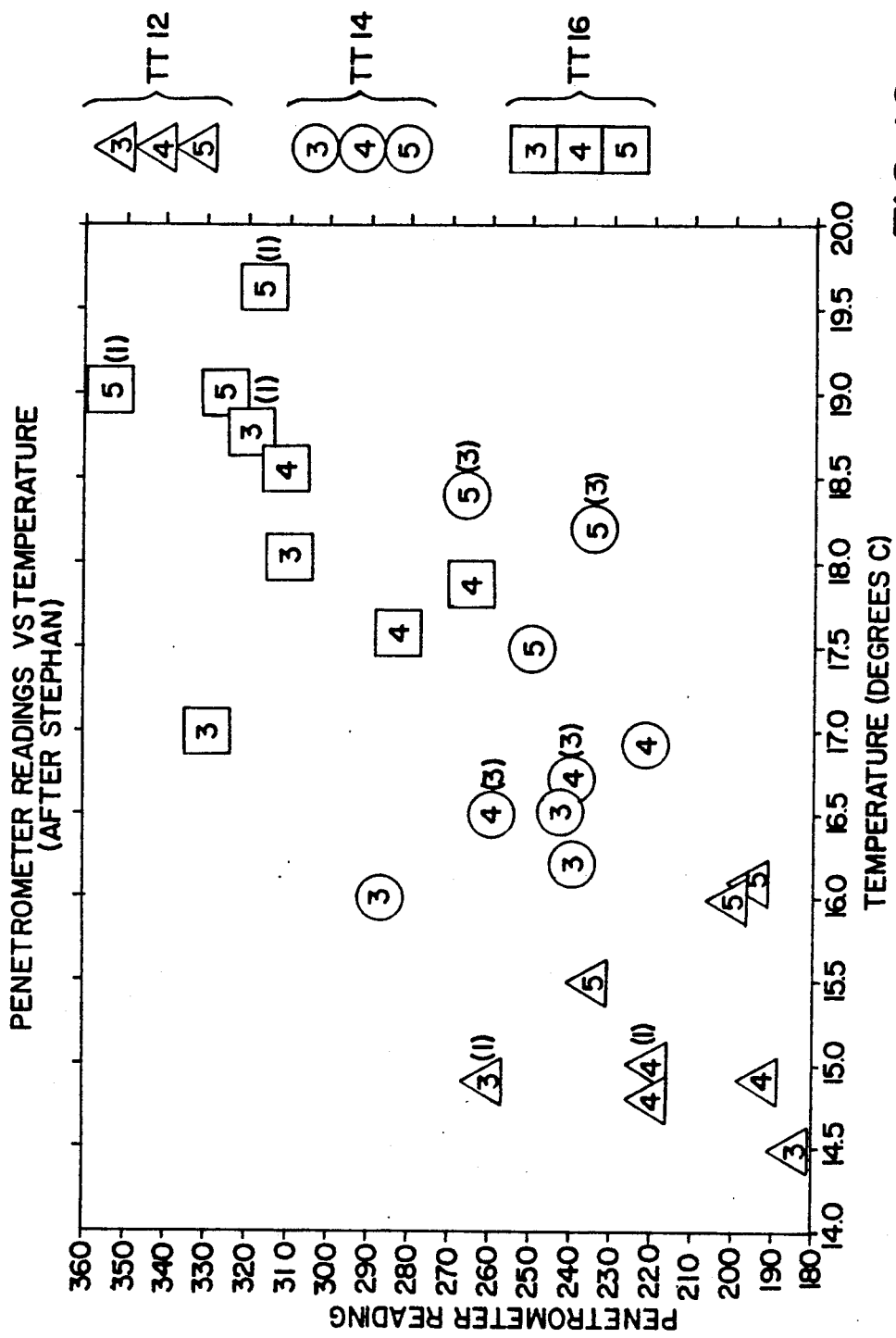
FIG. 10 is a graphical representation in which penetrometer readings are plotted against the temperature of each post comminution sample of products of the present invention, and showing preferred processing conditions and product characteristics associated with "printability".
Figure 11:
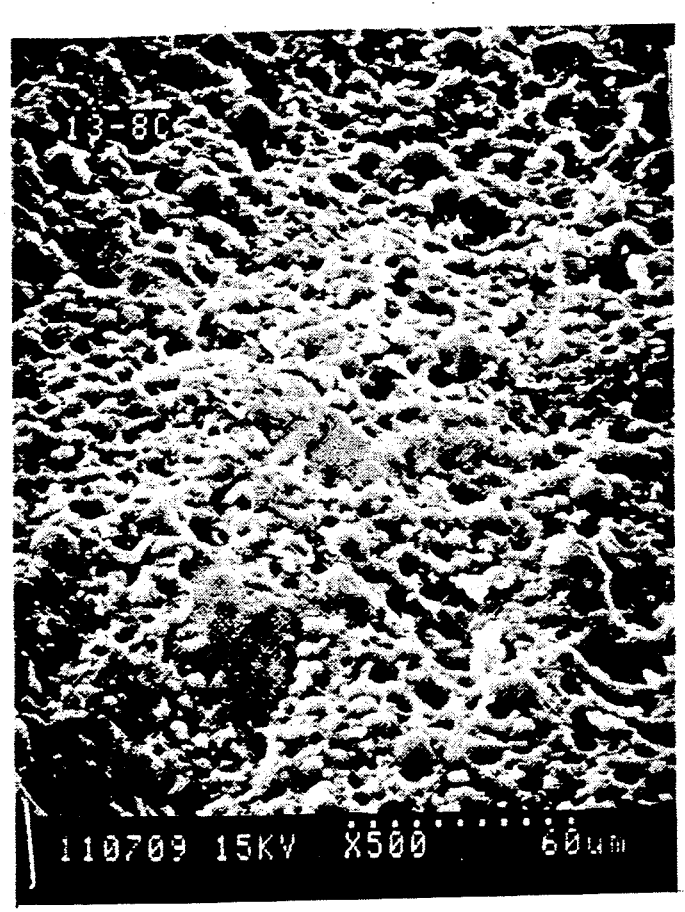
FIGS. 11 and 12 are photomicrographs of samples taken immediately following post comminution crystallization from the same production run that was sampled for the purposes of FIGS. 7 and 9.
Figure 12:
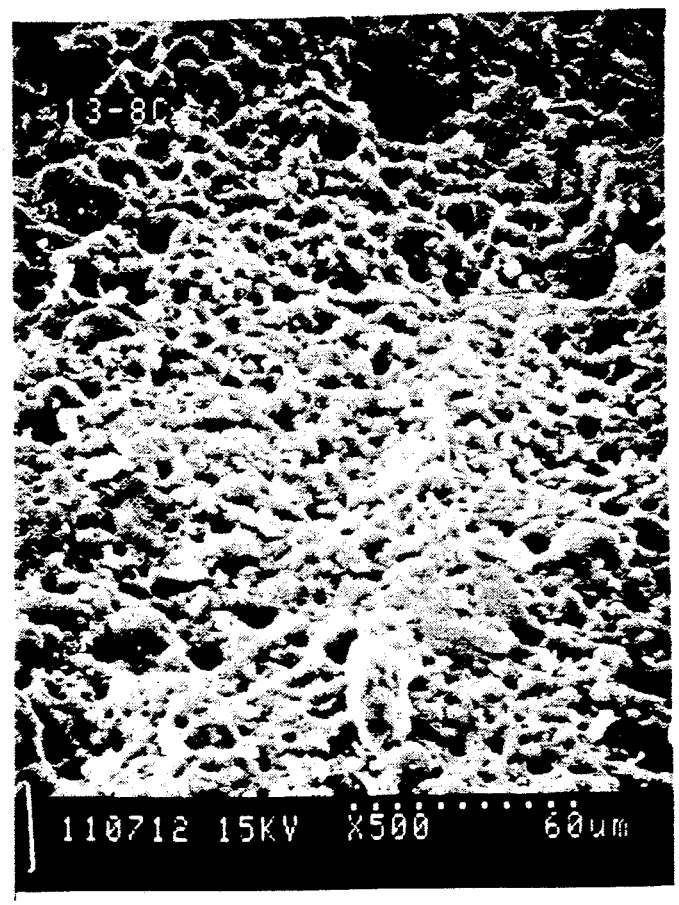
Figure 13:
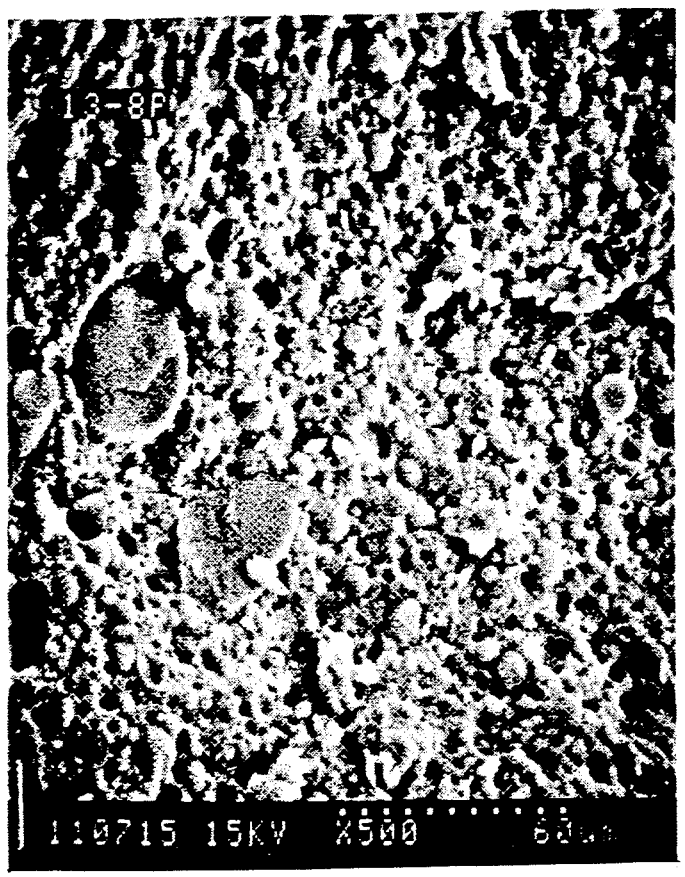
FIGS. 13 and 14 are photomicrographs of printed product produced from the same production run from which samples are shown in FIGS. 7, 9, 11 and 12.
Figure 14:
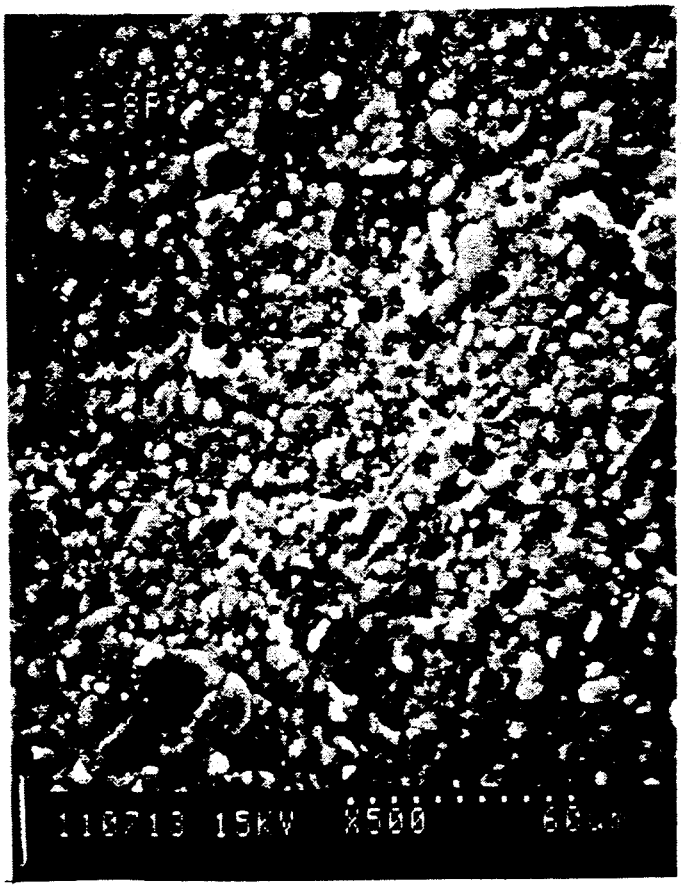
Figure 15:
FIGS. 15 through 18 are photomicrographs of other "printed" products of the present invention.
Figure 16:
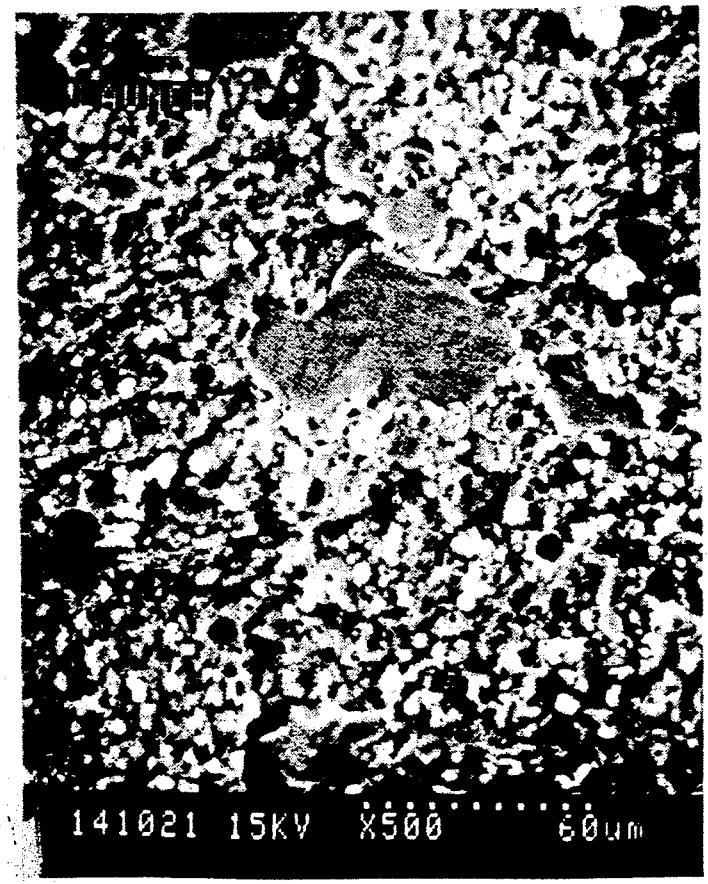
Figure 17:
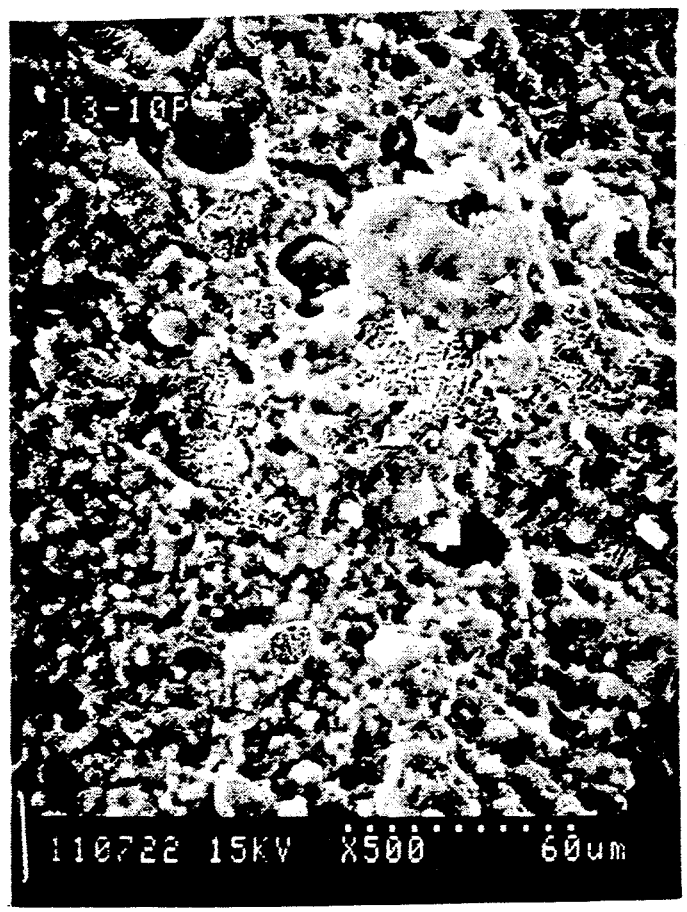
Figure 18:
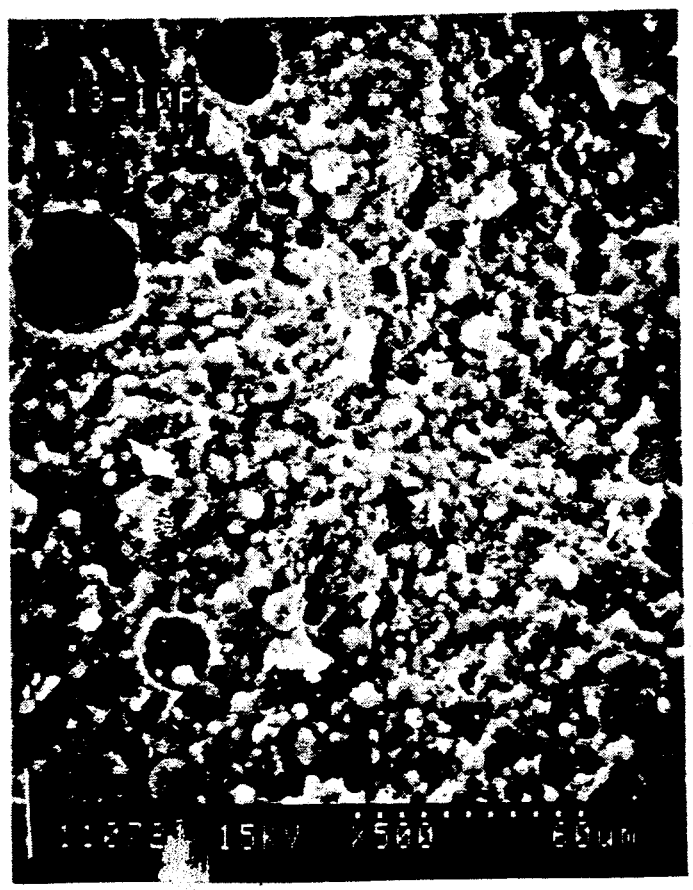

Referring now to FIG. 10 of the drawings, there is depicted a graphical representation showing the same kind of relationships already described in relation to FIG. 8, between penetrometer readings and temperature, but in the case of FIG. 9, for samples taken immediately after comminution. Products most suited for printing exit the comminutor at greater than 15° C. and less than about 18.5° C. and preferably between 16.5° C. and 15.5° C. The penetrometer readings are preferably between 210 and 290, especially 230 to 270.

FIG. 9 of the drawings shows an electron micrograph of the sample of comminuted water-in-oil product taken immediately following comminution. The figure clearly illustrates the substantial improvement in dispersion and distribution of the aqueous phase resulting from the comminution process. The sample in question was produced in accordance with the process outlined in FIG. 5, using the comminutor apparatus shown in FIGS. 1 to 4. Pre-crystallization was carried out at about 13° C. and the comminution was operated at about 2,963 rpm, with a product temperature rise across the comminutor of about 7 centigrade degrees.

Post comminution Handling and Packaging

Control of back pressure following comminution, and during the handling and packaging of the fat reduced and especially low-fat spread products described herein, has been found to be significant in avoiding irreversible damage to the product's stability. Minimizing line pressure is highly desirable, although some allowance must be made for the type of packaging equipment being used. In the case of products to be packed in tubs, such back pressures can be readily minimized, as will be apparent to the person skilled in the art in light of the present disclosure.

Where the product is to be printed however, consideration must be given both to post comminution crystallization effects, and minimum operating pressures required for commercial printing apparatus. In order to accommodate such a crystallization process, the comminuted product should be subjected to a resting stage in known manner sufficient to provide a degree of fat crystallization suitable for surviving the rigors of the particular printing apparatus. The duration of the resting stage and the amount of shear and especially back pressure to which the comminuted product is subjected can be readily determined empirically with a minimum of experimentation by a person skilled in the art, in light of the present disclosure.

With regard to necessary operating back pressures in the supply line to commercial printing apparatus, the applicants have found that line pressures of between 10 and 65 psi are preferred. The lower limit of this range is based on the minimum supply pressure necessary to operate a Benhil Multipack 8380 butter printer. Another commercial printing apparatus, the Sig Model F100 printer requires somewhat higher line pressure feeds, and will accommodate only lower delta-t products from the comminutor (preferably about 2° C.). Accordingly the Sig Printer is less preferred. Other commercial packing machines include by way of example Gerstenberg Block Packer VHA/VFA, HFR and PFR-K all of which are available from Gerstenberg and Agger A/S, Denmark. Printing is preferably carried out at product temperatures of less than 68° F.

Pressure

Line pressure compensation and control can be achieved in known manner in the art. A particularly preferred compensator is the Sig standard pneumatic compensator (used in conventional oleomargarin production lines) described in detail elsewhere herein. Other compensators include for example, Gerstenberg type 32 and type 40 compensators, although these latter two are high pressure compensators and their high pressure capacity may not be required for the purposes described herein. The applicants have also found that use of a slightly heated (to keep product flowing evenly) 30' to 40' length of 2" pipe open at the exit thereof and connected to the processing line intermediate between the comminutor and the printer, can also provide suitable back pressure control. The selection of apparatus for use in back pressure control will depend on the amount of back pressure required to meet the supply requirements for the particular printer apparatus.

PREFERRED EMBODIMENT

In accordance with a preferred aspect of the present invention there is provided a process for producing a printable low-fat butter product comprising a combination of butter and buttermilk. Unless otherwise expressly provided, reference numerals used in this part of the specification will be to FIG. 5.

In accordance with that process, butter obtained from Ault Foods Limited, Laverlocher, comprising 80% fat, 1.5% solids not fat and 1.9% salt was taken from a refrigerator at 7° C. and passed directly at 10° C. into a Benz & Hilgers GMBH Butter Reworker (Typ 8477, Bauj 1979, Auftrag 477/21), 1. The butter was processed at a residence time of 1.44 seconds per kilogram. The Reworker includes a steam jacketed chute at the outlet thereof. The butter is deposited as blocks at the inlet of the Reworker, and is captured by the flights of twin extruder screws, passed through the machine under pressure and partially melted therein by the time it reached the exit chute. The exit chute is heated to a temperature sufficient to further melt the butter, but is primarily intended merely to keep the butter flowing smoothly and cleanly exiting from the Reworker. The temperature of the butter exiting the Reworker is about 14° C. The butter is then passed into a Cherry Burrell Round Processor Model WTC, 2.

This device is described in general in U.S. Pat. No. 2,144,713 and 2,371,807. The butter is heated to between 32° C. and 37° C. and preferably between 32° C. and 35° C., then held for mixing.

A preferred buttermilk useful in the practice of the present invention is available from Ault Foods Limited at Laverlochere, Quebec. The buttermilk comprises a maximum fat level of about 1.7% and total solids ranging between 21% and 23%. The product has a maximum titratable acidity of about 0.12% as measured at 9% total solids. The buttermilk is obtained from cream which does not contain any whey cream, and is free of any neutralizer residues. The buttermilk is held below 7° C. prior to processing. It is preheated to a temperature of 92° C. for a holding time of about 170 seconds and then passed into a falling film evaporator until the desired solids level is achieved. The product is then cooled to less than 4.4° C. and has a sweet clean flavour.

The buttermilk is introduced into a Cherry Burrell Composition Control unit model WTS, 3. This apparatus is described in detail in U.S. Pat. Nos. 2,144,713, 2,371,807, and 2,536,297. Water is added to the buttermilk in order to standardize the water content of the final buttermilk/butter admixture, including butter, to 10.6% milk solids not fat.

The standardized buttermilk is then pasteurized under agitation at 18 rpm in the side swept composition unit, by raising the temperature of the buttermilk to 71° C. for 30 minutes. Following pasteurization the temperature of the standardized buttermilk is reduced to between 32 and 37 and preferably between 32° C. and 35° C.

The standardized, pasteurized buttermilk is then pumped through a Cherry Burrell Model A Pump, 4, at a rate of about 110 pounds to 120 pounds per minute into a sparger device, 5, located beneath the surface of the melted butter held in the Cherry Burrell Round Processor Model WTC, 2. The sparger, 5, is a 2⅜" diameter spherical stainless steel sprayball mounted on a 1" inside diameter threaded stainless steel 1½" long inlet fitting. The sparger ball includes 62, 1/16" diameter holes in the hemisphere thereof, opposite the inlet fitting. The buttermilk and melted butter are then admixed over a period of between 15 and 20 minutes and under constant agitation in the Round Processor, 2, run at 48 rpm.

A preferred formulation of the present invention results in the admixture of butter having about 80% fat, 1.5% solids not fat and 1.9% salt, with condensed buttermilk having a total solids of about 34.22%, 2.15% fat, 32.07% solids not fat and about 65.78% moisture, together with sufficient additional water, to produce a final composition comprising about 38½% fat, 10.6% milk solids not fat, 1.5% salt, 50.6% total solids and 49.4% moisture. The preferred product contains about 389 calories per gram, as compared with regular commercial butter at about 725 calories per 100 grams.

Once the mixing is complete, and a stable, coarse water-in-oil mixture has been formed, the mixture is delivered through an APV Crepaco Pump, 6, size R3R powered by a Sterling Model 88D, 1.5 horse power, 60 to 300 rpm motor with a 9.3 gear ratio operating off a Sterling Speedtrol at a rate sufficient to keep a downstream positive pump supplied at a line pressure of between 8 and 15 psi. The temperature of the mixture is within the range of 36° C. to 37° C.

The mixture is thus supplied to a Gaulin Homogenizer, 7, with variable speed drive. The homogenizer, 7, has been modified through the removal of the homogenizer valves and valve seats. In this configuration the homogenizer, 7, operates only as a positive displacement pump. The pump is designed to operate in the range of 1,800 to 4,000 pounds per hour, is preferably operated at about 2,400 pounds per hour (18.2 kilograms per minute). This results in a line pressure of between 42 to 160 psi immediately downstream of the homogenizer, 7. The higher line pressure values are associated with high solids, usually fat-reduced, products. In the production of low-fat butter products, line pressures are more typically in the range of 40 to 60 or 70 psi. The temperature of the mixture exiting the homogenizer is in the range of 33° C. to 35° C. Mixture is pumped under pressure to a Cherry Burrell Thermutator Model 672, 8. The residence time within the Thermutator, 8, with the equipment operating at 2,400 pounds per hour, is about 1.2 minutes. In the manufacture of low-fat products, only one leg of the Thermutator, 8, is used to achieve pre-crystallization of the butterfat. In the higher solids embodiments, both legs, with longer residence times must be used to achieve the same degree of pre-crystallization. The residence time in a single leg of this apparatus is about 1.2 minutes with a rate of through put of 2,400 lbs/hr. The temperature of the product exiting the Cherry Burrell Thermutator, 8, is about 10.5° C. to 19° C. The mixture is passed into a resting tube comprising a length of three inch diameter tubing, of sufficient length for the product, to reside therein for about 60 seconds at a through put of about 2,400 lbs/hr. The product undergoes an increase in temperature of between about one and one-half of 1° C. as a result of loss of latent heat of crystallization during the product's residence in this tube, 9. Upon exiting the tube, 9, the temperature of the pre-crystallized mixture is between about 11° C. and 20° C. (preferably 13° C. to 15° C.; and especially 13.5° C. to 14.5° C.), and the line pressure is between 25 and 110 psi. Again, the higher line pressures are associated with high solids, i.e. fat reduced products. In the case of low-fat products, the line pressure is preferably between 25 and 65 psi.

Comminution

The pre-crystallized mixture is then passed to a comminutor device, 10. A preferred comminutor apparatus is the Stephan Microcut, Model MC15, Comminutor.

Figure 2:
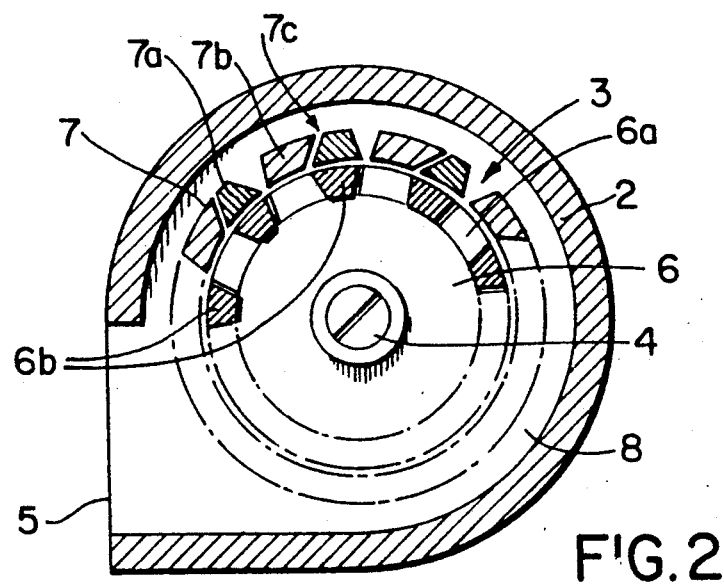

Referring now to FIG. 1 of the drawings, there is depicted a view taken through a portion of a preferred comminuting apparatus associated with the present invention. The apparatus comprises a base and motor housing, 1, arranged to support a comminutor housing, 2, containing a comminuting blade assembly, 3. The blade assembly is rotatable about a drive shaft, 4, connected and driven relation to a motor, not shown, located within the base and motor housing, 1. Product enters the comminutor housing from above, and travels downwardly therethrough, through the cutter assembly, 3, and is finally passed outwardly through outlet 5. FIG. 2 of the drawings is a cross section in plan view taken through lines A and A-prime of FIG. 1. FIG. 2 depicts the relationship between the comminutor housing, 2, and the rotor, 6, and stator, 7, of the cutter arrangement, 3. Product travels downwardly through the comminutor housing, 2, into the interior of the rotor, 6. Product is then forced outwardly through gaps, 6a, between the blades, 6b, of the rotor, 6, where the product is sheared between the leading edge of blades 6a and the stationary faces of blades 7a adjacent gaps 7c formed between blades 7a and spacer element 7b in the stator 7. The comminuted product passes through the paths, 7c, into a comminutor housing manifold, 8. Finally the product flows under distributive mixing conditions to outlet 5.

Figure 3:
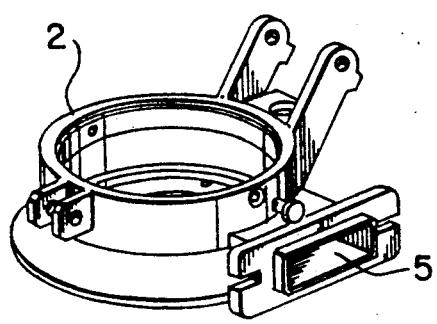

FIG. 3 of the drawings illustrates in an exploded perspective view the comminutor housing 2, shaft 3, and a bearing assembly, 9. Stator 7 is depicted with blade rings 7a and spacers 7b assembled. Also shown as an optional helical screw 10 for facilitating the supply of product to the inside surfaces of stator 6.

Referring now to FIG. 4 of the drawings, there is shown an exploded view in detail of the blade assembly 3 depicting rotor 6, and an exploded view of stator 7 illustrating in detail, blade ring 7a and spacer ring 7b. The inside diameter of stator ring 7, as assembled, is 125 mm. The assembled stator includes 20 gaps therein, each of which are about 0.05 mm wide by 25 mm high. The rotor 6 includes 19 angled teeth spaced 9 mm apart from one another. Each such tooth has a slant height of 25 mm and the length of the carbide cutting face 11 is 11 mm.

In operation, using the preferred water-in-oil formulation described hereinabove at a through put of 2,400 lbs thereof per hour the comminuting device described hereinabove resulted in product temperature increases as shown below in TABLE 1.

TABLE 1

| Operating Speed (rpm) | Temperature Rise (In Celsius Degrees) |
|---|---|
| 0 | less than 1 |
| 1320 | greater than 1 |
| 2140 | about 4 |
| 2960 | about 7 |
| 3570 | about 11 |

EXAMPLE 1

In accordance with the preferred practice of the present invention Ault Foods Limited buttermilk from Laverlochere, containing 25.11% total solids, 2.05% fat was standardized by admixing 319.68 kilograms of the buttermilk with 218.56 kilograms of water in order to standardize the mixture to 8.7% milk solids not fat in the final mixture. This admixture was pasteurized at 82° C. for thirty minutes and processed in the Cherry Burrell Composition Control Unit Model WTS at 18 rpm. 4.4 Kilograms of salt were added to the admixture.

Ault Foods Limited butter from its Laverlochere facility, containing about 80% fat, 1.28% solids not fat and 1.9% salt was processed in a butter reworker to a temperature of about 14° C. About 440.26 kilograms of this butter was passed into a Cherry Burrell Round Processor Model WTC. The temperature of the butter was raised to between 32° C. and 37° C. and the butter was mixed with the buttermilk (also at the same temperature) in the manner hereinbefore described using a sparging ball and agitating the admixture at 48 rpm. Mixing time was about fifteen to twenty minutes. The resulting 982.91 kilograms of admixture contained 45.87% total solids and 36.5% butterfat. The mixture contained some large droplets of the aqueous disperse phase. The mixture was then pumped from the Cherry Burrell Round Processor at 34.5° C. and 15 psi to the already described Gaulin Homogenizer. The through put of the Homogenizer was set to 2,447 pounds per hour and the post-homogenizer line pressure was between 40 psig and 70 psig. The mixture was then passed to a Cherry Burrell Thermutator whereafter about 1.2 minutes residence time it exited at about 14° C. Post-crystallization line pressures were between 35 psi and 60 psi. The partially crystallized mixture was then passed to the Stephan Comminutor operating at about 1,320 rpm. The mixture exited the Comminutor at 15.5° C. at a line pressure of 15 psig to 30 psig. The product was then printed in one pound blocks using the Sig Model F100 printer.

EXAMPLE 2

In this example 439.21 kilograms of buttermilk obtained from Ault Foods Limited Laverlochere facility and comprising 24.77% total solids, and 1.8% fat, were admixed with 87.51 kilograms of water. The mixture was pasteurized at 71° C. for thirty minutes in a Cherry Burrell Composition Control Unit Model WTS. 6.09 Kilograms of salt were added to the admixture.

475 Kilograms of butter, substantially as described hereinabove in relation to Example 1, was passed at about 14° C. from a butter reworker into a Cherry Burrell Round Processor Model WTC. The butter was heated to between 32° C. and 37° C. and admixed with buttermilk held at the same temperature in the manner already described herein. The total weight of the admixture was 1007.82 kilograms, and contained 50.60% total solids, 38.5% butterfat and 1.5% salt. The resulting mixture was observed to be smooth and creamy with a high degree of homogeneity. The admixture was then pumped at about 35° C. and 14 psig to 18 psig to the aforementioned Gaulin Homogenizer. The Homogenizer delivered 2,400 pounds per hour of the admixture, at 45 psig to 55 psig, to a Cherry Burrell Thermutator. After about a one minute residence time in the Thermutator the temperature of the mixture had been reduced to between 13.7° and 14.3° centigrade. This product was delivered at between 40 psig and 50 psig to the Stephan Comminutor. The Comminutor was operated at 1,320 rpm, and product exited the Comminutor at about 16.5° C. and 15 psig to 30 psig, which pressure was maintained using known compensator apparatus. The product was passed to a Sig Model F100 printer and printed in one pound blocks. The resulting product was a high quality product with glossy surface.

EXAMPLE 3

325.33 Kilograms of buttermilk, sourced as hereinbefore described in relation to Examples 1 and 2, containing 33.74% total solids, 2.7% fat, was admixed with 203.37 kilograms of water. The admixture was pasteurized at 71° C. for thirty minutes in a Cherry Burrell Composition Control Unit Model WTS. 6.12 Kilograms of salt were added to the admixture in the Composition Control Unit.

475 Kilograms of butter, substantially as described hereinbefore in relation to Examples 1 and 2, was passed through a butter reworker, and exited at about 14° C. into a Cherry Burrell Round Processor Model WTC. The buttermilk and butter were admixed substantially in the manner already described to produce a final admixture of 1009.83 kilograms having 50.6% total solids and 38.5% butterfat and 1.5% salt. The mixture was of good quality, well dispersed mixture.

The mixture was pumped at 34.5° C. and 10 psi to 12 psi to the Gaulin Homogenizer. The Homogenizer was operated at 40 psi to 70 psi with a through put of 2,407 pounds per hour of mixture. The mixture was then passed to the Cherry Burrell Thermutator where after 1.2 minutes residence time the temperature was reduced to 13.8° C. The line temperature between the pre-crystallization apparatus and the Stephan Comminutor was 35 psi to 65 psi. The Stephan Comminutor was run at 1,320 rpm, and the product exited the Comminutor at about 15.9° C. and 15 psig to 25 psig. The resulting product was printed using a Sig Model F100 printer, as one pound blocks. The product was of good quality.

EXAMPLE 4

439.41 kilograms of buttermilk containing 24.38% total solids, 1.5% fat was admixed with 84.9 kilograms of water and pasteurized for thirty minutes at 71° C. in a Cherry Burrell Composition Control Unit Model WTS. 6.06 Kilograms of salt were added to this admixture.

475 Kilograms of Ault Foods Limited butter obtained from Laverlochere and comprising 80.1% fat, 1.50% solids not fat and 1.9% salt were worked in a butter reworker to a temperature of 14° C., and then passed to a Cherry Burrell Round Processor Model WTC. The butter was then heated to between 32° C. and 37° C. and admixed substantially in the same manner already described hereinabove, with the buttermilk to produce 1005.37 kilograms, a mixture having 50.71% total solids and 38.5% butterfat and 1.5% salt. The mixture was characterized as being very stable and uniform mixture. The mixture was then pumped at 10 psi and 35° centigrade to the Gaulin Homogenizer. The Homogenizer delivered the mixture at 2,400 pounds per hour and a line pressure of 45 psi to 55 psi to the Cherry Burrell Thermutator. After slightly over a minute residence time, the product temperature had dropped to 13° C. Line pressure between the Thermutator and the Stephan Comminutor was between 40 psi and 45 psi. The Stephan Comminutor was operated at about 2,960 rpm, and product exited the Comminutor at about 20° C. at a line pressure of 25 psi. The pressure was maintained in known manner using a commercial compensator. The product was then passed to a Benhil Model 8345 printer and printed as ¼ pound blocks. The final product was described as smooth and showed no evidence of free surface moisture.

EXAMPLE 5

285.18 Kilograms of buttermilk containing 28.21% total solids, 1.72% fat was admixed with 5.94 kilograms of water and the admixture was pasteurized a 71° C. for thirty minutes. 1.9 Kilograms of salt were added to this admixture.

625 kilograms of butter comprising 80% fat, 1.28% solids not fat and 1.9% salt were worked in a butter reworker to about 14° C. The butter was passed to a Cherry Burrell Round Processor Model WTC and heated to between 32° C. and 37° C. The buttermilk admixture was added to the melted butter at approximately the same temperature to produce a final admixture of 918.01 kilograms containing 65.6% total solids and 55% butterfat and 1.8% salt. The admixture was passed at 36° C. and 15 psi to the Gaulin Homogenizer which in turn delivered 2,350 pounds per hour at between 100 psi and 160 psi to the Cherry Burrell Thermutator. Both legs of the Thermutator were used to pre-crystallize the fat which dropped in temperature to about 13° C. to 14° C. after approximately 2.5 minutes residence. The line pressure intermediate, the pre-crystallization apparatus and the Stephan Comminutor was between 80 psi and 110 psi. The Comminutor was operated at 2,960 rpm and the product exited the Comminutor at between 20 psi and 30 psi. The product was then passed to a Benhil Model 8345 printer and printed as ¼ pound blocks. The resulting fat reduced product was smooth and showed no evidence of free surface water.

EXAMPLE 6

426.79 Kilograms of buttermilk comprising 25.02% total solids and 1.48% fat was admixed with 96.82 kilograms of water and the admixture was pasteurized at 71° C. for thirty minutes. 60.04 Kilograms of salt were added to the admixture.

475 Kilograms of butter substantially as hereinbefore described, and containing 80% fat, 1.5% solids not fat and 1.9% salt was reworked in a butter reworker to 14° centigrade. The butter was then passed to a Cherry Burrell Round Processor Model WTC and heated to between 32° C. and 37° C. The buttermilk and butter were then admixed to produce 1004.63 kilograms of a mixture having 50.71% total solids, 38.5% butterfat, and 1.5% salt. The mixture was then pumped at 36° C. and 10 psi to a Gaulin Homogenizer operating at a through put of 2,350 pounds per hour and generating line pressures of 30 psi to 50 psi. The product was passed to a Cherry Burrell Thermutator and after a little over a minute residence time had a product temperature of 13° C. Line pressure intermediate the pre-crystallization apparatus and the Stephan Comminutor was 25 psi to 45 psi. The Stephan Comminutor was operated at 2,960 rpm and product exiting the Comminutor did so at 20° C. and 15 psi to 30 psi. The product was passed to a Benhil Model 8345 printer and printed as ¼ pound blocks to produce a smooth, low-fat butter product without any substantial amount of free surface water.

We claim:

1. A process for producing an edible fat-reduced spread of the water-in-oil type comprising:
   a) providing a mixture consisting of a dispersion of water in partially uncrystallized fat;
   b) feeding said mixture into a turbine-like comminuting device in which the mixture passes through an inlet into a comminuting chamber containing closely-spaced relatively-rotating concentric inner and outer rings of spaced blades to cause the mixture to pass through the rings of blades and between the blades thereof so as to be cut and mixed thereby and then passed to an outlet; and,
   c) the increase in temperature of the mixture caused by said cutting and mixing being from about 1.5 Celsius degrees up to a temperature above which the mixture becomes destabilized and substantial amounts of water are released from the mixture.

2. A process according to claim 1 wherein the increase in temperature of the mixture caused by said cutting and mixing in the turbine-like comminuting device is between about 1.5 and 20 Celsius degrees.

3. A process according to claim 2 wherein said temperature increase is between about 1.5 and 10 Celsius degrees.

4. A process according to claim 3 wherein said temperature increase is between about 2 and 8 Celsius degrees.

5. The process of claim 1 wherein the edible fat is selected from the group consisting of butter fat, margarine fats, and mixtures thereof.

6. The process of claim 5 wherein said butterfat is selected from the group consisting of butter, renovated butter, butter oil, and mixtures thereof.

7. The process of claim 6 wherein the butter comprises not less than 80% by weight of milk fat.

8. The process according to claim 7 wherein the butter comprises about 80% milk fat, 16 percent moisture, about 2% milk solids not fat curd, and up to about 2% salt.

9. The process of claim 1 wherein the mixture contains between 30% and 75% fat by weight.

10. The process of claim 9 wherein the mixture contains between 30% and 50% fat by weight.

11. The process of claim 10 wherein the mixture contains between 35% and 40% fat by weight.

12. The process according to claim 11 wherein the water is homogeneously dispersed in the fat.

13. The process of claim 1 wherein the mixture of water dispersed in the fat has a temperature of 13° C. to 17° C. and penetrometer values of between 210 and 360.

14. The process according to claim 13 wherein the mixture has a temperature of between 14.5° C. and 16.5° C.

15. The process according to claim 14 wherein the mixture has a temperature of between 14.5° C. and 15.5° C.

16. The process according to claim 1 wherein the temperature of the mixture upon cutting and mixing is 15° C. to 18.5° C.

17. The process according to claim 16 wherein the temperature of the mixture upon cutting and mixing is between 15.5° C. and 16.5° C.

18. The process according to claim 16 wherein the penetrometer value of the mixture upon cutting and mixing is between 210 and 290.

19. The process of claim 18 wherein the penetrometer value is between 230 and 270.

20. The process according to claim 1 wherein the temperature rise of the mixture due to mixing alone is about 1 to 0.5 Celsius degrees.

21. An edible fat-reduced spread of the water-in-oil type consisting of buttermilk-in-butter and having a fat content not exceeding 75% by weight and a total solids content of 45% to 65% by weight at room temperature, said spread having been prepared by:
a) providing a mixture consisting of a dispersion of water in partially uncrystallized fat;
b) feeding said mixture into a turbine-like comminuting device in which the mixture passes through an inlet into a comminuting chamber containing closing-spaced relatively-rotating concentric inner and outer rings of spaced blades to cause the mixture to pass through the rings of blades and between the blades thereof so as to be cut and mixed thereby and then passed to an outlet; and,
c) the increase in temperature of the mixture caused by said cutting and mixing being from about 1.5 Celsius degrees up to a temperature above which the mixture becomes destabilized and substantial amounts of water are released from the mixture.

22. The spread of claim 21 wherein the mixture further includes added water.

23. The spread of claim 21 wherein the mixture has a fat content of 75% to 30%.

24. The spread of claim 23 wherein the fat content is 50% to 30%.

25. The spread of claim 24 wherein the fat content is 40% to 35%.

26. The spread of claim 21 wherein the total solids content is between 45% and 50%.

27. The spread of claim 21 wherein the buttermilk is condensed buttermilk.

28. The spread of claim 21 wherein the butter comprises about 80% butterfat, between one and two percent non-fat milk solids and 0% to 2% salt.

29. The spread of claim 21 wherein the butter comprises about 80% butterfat, between 1.3% and 1.5% non-fat milk solids, and about 2% salt.

30. The spread of claim 21 wherein the buttermilk comprises about 24% to 33% total solids and 1.5% to 2% butterfat.

31. The spread of claim 21 wherein the mixture comprises about 30% to 44% buttermilk, 0% to 22% added water, 45% to 68% butter, and 0% to 1% added salt.

32. The spread of claim 21 wherein the mixture is a fat-reduced spread is a low-fat spread and the amount of added water is between 8% and 22%.

33. The spread of claim 21 wherein the fat-reduced spread is a low-fat spread and contains between 45% to 47% butter.

* * * * *